United States Patent [19]

Adachi et al.

[11] Patent Number: 4,864,132
[45] Date of Patent: * Sep. 5, 1989

[54] RADIATION IMAGE READ-OUT APPARATUS

[75] Inventors: Yuuma Adachi; Nobuyoshi Nakajima, both of Kanagawa, Japan

[73] Assignee: Fuji Photo Film Co., Ltd., Kanagawa, Japan

[*] Notice: The portion of the term of this patent subsequent to Aug. 29, 2006 has been disclaimed.

[21] Appl. No.: 789,238

[22] Filed: Oct. 18, 1985

[30] Foreign Application Priority Data

Oct. 18, 1984 [JP] Japan ................... 59-218856

[51] Int. Cl.[4] ............................................ G01N 23/04
[52] U.S. Cl. .................................................. 250/327.2
[58] Field of Search ......................... 250/327.2, 484.1

[56] References Cited

U.S. PATENT DOCUMENTS

Re. 31,847 3/1985 Luckey .............................. 250/327.2
4,498,006 2/1985 Horikawa et al. ............... 250/327.2

Primary Examiner—Carolyn E. Fields
Attorney, Agent, or Firm—Sughrue, Mion, Zinn, Macpeak & Seas

[57] ABSTRACT

In a radiation image read-out apparatus wherein preliminary read-out is ordinarily conucted prior to final read-out for adjusting final read-out conditions and/or image processing conditions for radiation images stored on stimulable phosphor sheets, the preliminary read-out can be omitted and the final read-out and image processing be conducted on the basis of fixed conditions when necessary to obtain reproduced images with the same contrast.

6 Claims, 2 Drawing Sheets

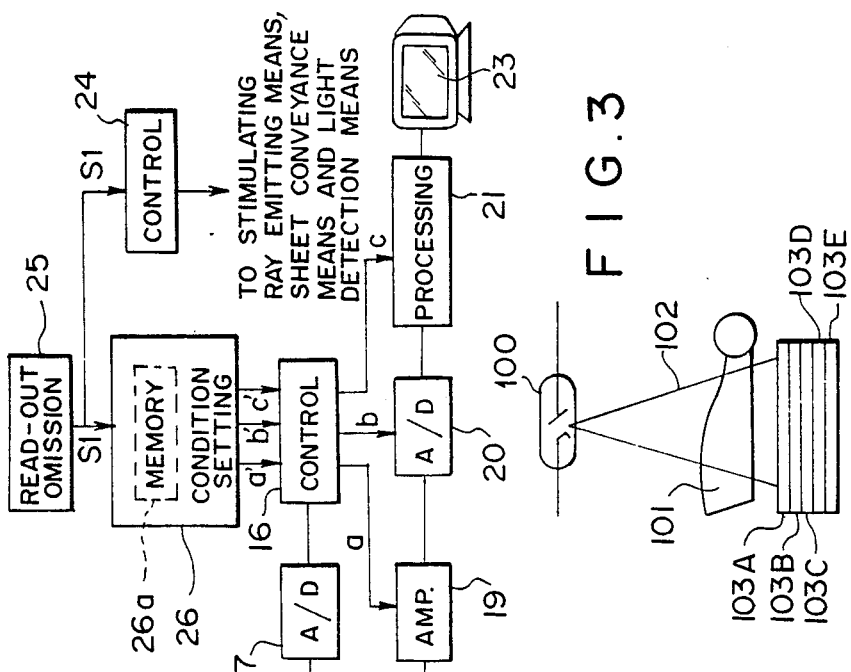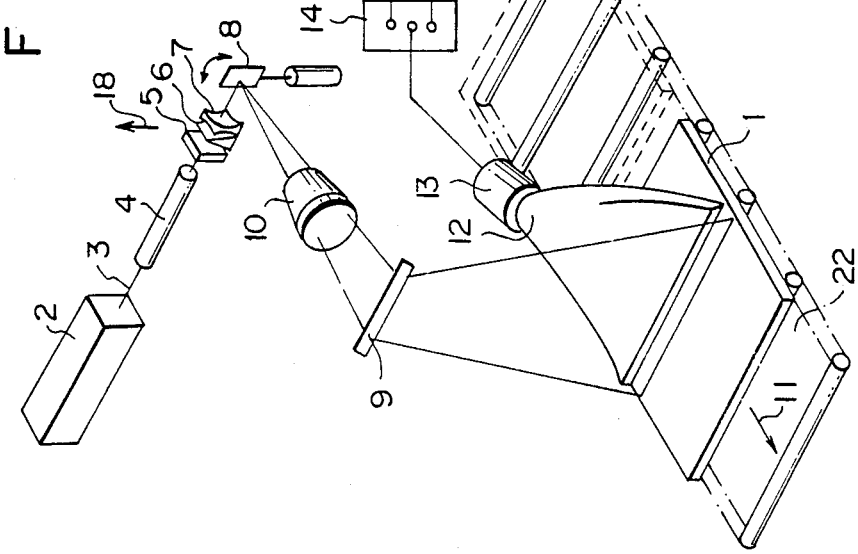

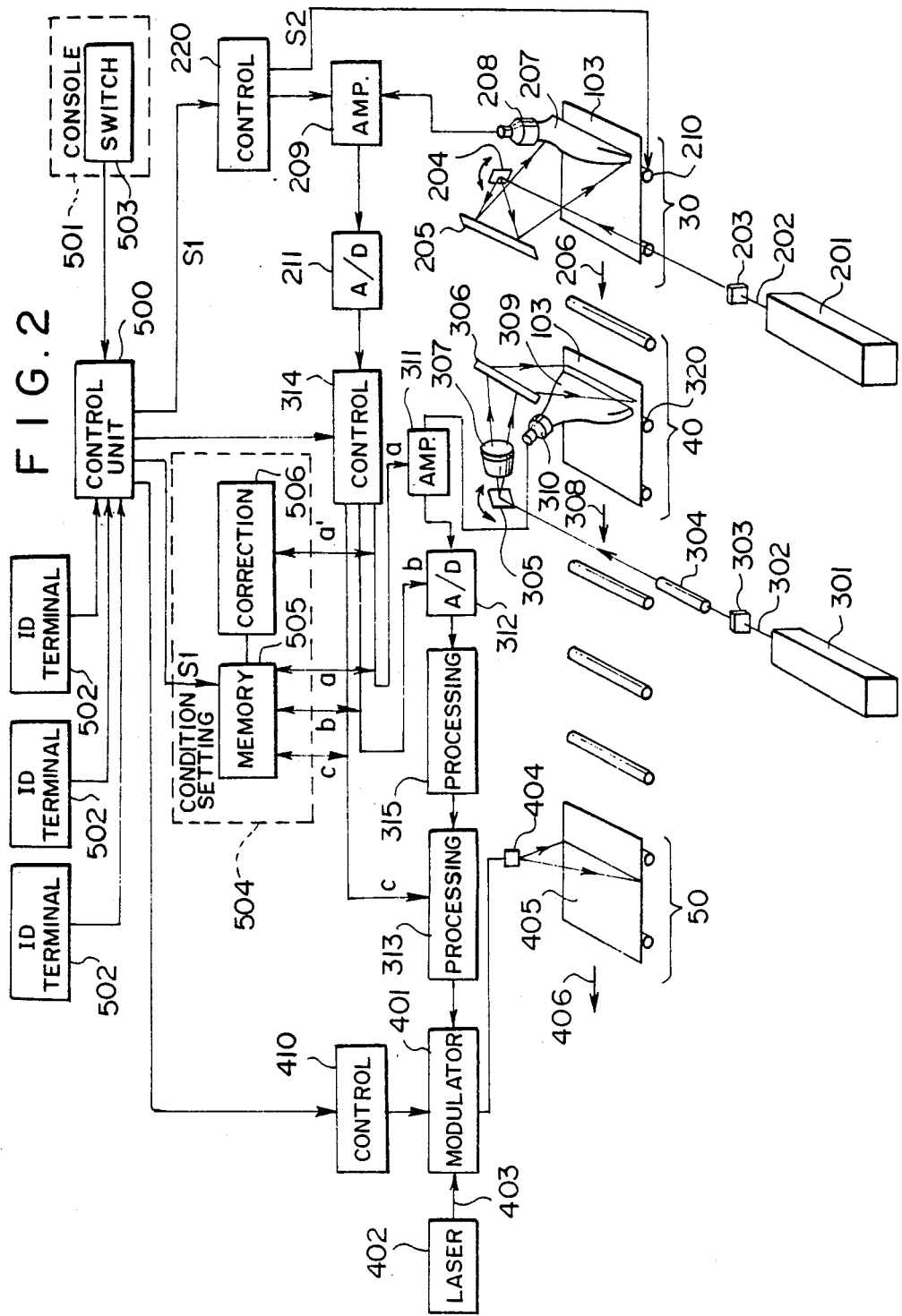

RADIATION IMAGE READ-OUT APPARATUS

BACKGROUND OF THE INVENTION

1. Field of the Invention

This invention relates to an apparatus for reading out a radiation image stored on a stimulable phosphor sheet by exposing the stimulable phosphor sheet to stimulating rays which cause it to emit light in proportion to the stored radiation energy, and photoelectrically detecting the emitted light. This invention particularly relates to a radiation image read-out apparatus wherein preliminary read-out is conducted for approximately ascertaining the image input information prior to final read-out for reproducing a visible image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in the applicant's Japanese Unexamined Patent Publication No. 56(1981)-11395 and U.S. Pat. No. 4,258,264, it has been proposed to use a stimulable phosphor in a radiation image recording an reproducing system. Specifically, a sheet provided with a layer of the stimulable phosphor is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a very wide range in proportion to the amount of energy stored thereon, it is possible to obtain an image having desirable density regardless of the amount of exposure of the stimulable phosphor to the radiation, by reading out the emitted light with an appropriate read-out gain and converting it to an electric image signal to reproduce a visible image on a recording medium or a display device.

This system is also advantageous in that after the radiation image information stored on the stimulable phosphor sheet has been read out and converted into an electric image signal, the electric image signal can then be easily processed in the manner most appropriate for obtaining a radiation image suitable for viewing, particularly for diagnostic purposes, when it is used for reproducing a visible image on a photographic light-sensitive material or on a display device such as a CRT.

As mentioned above, in the radiation image system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low.

However, in order to eliminate various effects caused by the fluctuation of radiographic exposure conditions and to obtain a radiation image having high image quality, it is necessary to ascertain the image input conditions of the radiation image stored on the stimulable phosphor sheet and the image input pattern which is determined by the portion of the body (e.g. the chest or the abdomen) or the radiographic method used, such as plain image or contrasted image radiographic, before reproducing the radiation image as a visible image for viewing, and then to adjust the read-out gain appropriately based on the detected input conditions and the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information can be conducted prior to the visible image reproduction by use of the method as disclosed in Japanese Unexamined Patent Publication No. 58(1983)-67240. In the disclosed method, a read-out operation for detecting the image input information of a radiation image stored on a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out gain is adjusted, and/or an appropriate signal processing is conducted, and/or the scale factor is adjusted to an appropriate value on the basis of the image input information obtained by the preliminary read-out.

For carrying out this method there can be used a radiation image read-out apparatus including a final read-out system comprising a means for emitting stimulating rays to a stimulable phosphor sheet carrying a radiation image stored thereon, a means for moving the stimulable phosphor sheet and a light detection means for photoelectrically detecting light carrying the radiation image and emitted by the stimulable phosphor sheet upon exposure to stimulating rays; a preliminary read-out means comprising a means for emitting stimulating rays, a means for moving said stimulable phosphor sheet and a light detection means for photoelectrically detecting the light carrying the radiation image and emitted by said stimulable phosphor sheet upon exposure to stimulating rays, the stimulation energy of which is lower than that of the stimulating rays in the final read out; and control means for setting the read-out conditions and/or the signal processing conditions on the basis of the image input information obtained by the preliminary read-out. Apparatuses of this type are disclosed in, for example, Japanese Unexamined Patent Publication Nos. 58(1983)-67242 and 58(1983)-67243.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays used in the final read-out, the output of the stimulating ray source such as a laser beam source may be decreased in the preliminary read-out, or the stimulating rays emitted by the stimulating ray source may be attenuated by an ND filter, an AOM or the like positioned on the optical path. Alternatively, a stimulating ray source for preliminary read-out may be provided independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

By the aforesaid method, since the image input conditions and the image input pattern of a radiation image stored on the stimulable phosphor sheet can be ascertained in advance, it is possible to obtain a radiation image having an improved image quality, particularly a high diagnostic efficiency and accuracy by adjusting the read-out gain and the scale factor on the basis of the detected image input information and by processing the detected electric image signal in the manner most suitable for the image input pattern without using a read-out system having a wide dynamic range.

However, when the aforesaid preliminary read-out is conducted, the time required for reading out the radiation image and processing the detected electric image signal is naturally longer than in the case where only the final read-out is conducted. Also, when the final read-out conditions are determined on the basis of the results of the preliminary read-out as in the aforesaid method, subtle differences in contrast tend to arise among the reproduced radiation images of different objects even when the radiation images relate to the same body portion of the objects. This is disadvantageous because when radiation images of the same body portion of different objects are diagnosed in comparison with each other it is generally preferable from the doctor's point of view for all of the radiation images to have the same contrast. It is also preferable to maintain the contrast of the reproduced radiation images at a prescribed level in the case where the performance of a radiation image recording apparatus is to be tested by recording radiation images of special phantoms on stimulable phosphor sheets and then examining the visible radiation images reproduced from these sheets. On the other hand, differently from when radiation images of portions of the human body are reproduced for diagnostic purposes, in the case of reproducing radiation images of microtomic organ sections or portions of animal bodies for research purposes, there is generally no problem even if the radiation images are reproduced with fixed contrast.

SUMMARY OF THE INVENTION

The primary object of the present invention is to provide a radiation image read-out apparatus wherein preliminary read-out can be omitted to enable high-speed radiation image read-out and electric image signal processing in cases where fixing of the read-out conditions, e.g. the read-out gain and the scale factor, and/or the electrical image signal processing conditions is advisable or permissible.

Another object of the present invention is to provide a radiation image read-out apparatus wherein the read-out conditions and/or the electric image signal processing conditions can be set as desired.

The present invention provides a radiation image read-out apparatus comprising:

(i) a final read-out system comprising a means for emitting stimulating rays to a stimulable phosphor sheet carrying a radiation image stored thereon, a means for moving said stimulable phosphor sheet, and a light detection means for photoelectrically detecting light carrying the radiation image and emitted by said stimulable phosphor sheet upon exposure to stimulating rays and converting it into an electric image signal for reproducing a visible image of the radiation image, (ii) a preliminary read-out system comprising a means for emitting stimulating rays, a means for moving said stimulable phosphor sheet, and a light detection means for photoelectrically detecting the light carrying the radiation image and emitted by said stimulable phosphor sheet upon exposure to stimulating rays and converting it into an electric signal representing the image input information of the stimulable phosphor sheet, the stimulation energy of the stimulating rays in the preliminary read-out being lower than that of the stimulating rays in the final read-out, (iii) signal processing means for processing the electric image signal from the final read-out system, and (iv) control means for setting the read-out conditions and/or the signal processing conditions on the basis of the image input information obtained by the preliminary read-out, wherein the improvement comprises the provision of a preliminary read-out omission command means for omitting the preliminary read-out and a fixed condition setting means for setting predetermined fixed final read-out conditions and/or electric image signal processing conditions when preliminary read-out is omitted.

The radiation read-out apparatus according to this invention can employ either a preliminary read-out system provided separately from the final read-out system as described in Japanese Unexamined Patent Publication No. 58(1983)-67242 or a preliminary read-out system such as described in Japanese Unexamined Patent Publication No. 58(1983)-67243 which uses the same stimulating ray emitting means, stimulable phosphor sheet moving means and light detecting means as the final read-out system and is provided with a regulating means for making the stimulation energy of the stimulating rays in the preliminary read-out lower than that of the stimulating rays in the final read-out.

The fixed condition setting means used in this invention can be arranged to obtain final read-out conditions and/or electric image signal processing conditions from a memory means in which these conditions are stored in advance and to set the conditions obtained from the memory means as the fixed conditions. Alternatively, it may be arranged to use as the fixed conditions the final read-out conditions and/or electrical signal processing conditions which were set by the control means with respect to a previously read-out stimulable phosphor sheet, or to use thereas such previously set conditions after subjecting them to a prescribed correction.

When preliminary read-out is omitted by the preliminary read-out omission command means, the read-out and processing of the radiation image can be speeded up in proportion to the amount of time saved by skipping the preliminary read-out. Further, since in this mode of operation the final read-out conditions and/or electric image signal processing conditions are fixed by the fixed condition setting means it is possible to set these conditions as desired independently of the image input information of the stimulable phosphor sheet.

BRIEF DESCRIPTION OF THE DRAWINGS

FIG. 1 is a schematic view showing a first embodiment of the radiation image read-out apparatus in accordance with the present invention, FIG. 2 is a schematic view showing a second embodiment of the radiation image read-out apparatus in accordance with the present invention, and FIG. 3 is an explanatory view showing an example of how a set of radiation images are recorded on a set of stimulable phosphor sheets which are to be subjected to radiation image read-out using the apparatus according to the present invention.

DESCRIPTION OF THE PREFERRED EMBODIMENTS

The present invention will hereinbelow be described in further detail with reference to the accompanying drawings.

FIG. 1 shows a first embodiment of the radiation image read-out apparatus in accordance with the present invention. A stimulable phosphor sheet 1 which has been exposed to a radiation, e.g. X-rays, passing through an object, e.g. a portion of the human body, so as to have a radiation image of the object recorded thereon is sent to the read-out apparatus shown in FIG. 1. When the stimulable phosphor sheet arrives at the read-out apparatus it is ordinarily first subjected to preliminary read-out. For this, a laser beam 3 emitted by a laser beam source 2 is first passed through a beam expander 4 to have its beam diameter strictly adjusted. The laser beam 3 is then passed through an ND filter 5, a prism 6 and a concave lens 7, whereby it is reduced in intensity and increased in beam diameter. Then, the laser beam 3 is one-dimensionally deflected by a light deflector 8 such as a galvanometer mirror and directed onto the stimulable phosphor sheet 1 by a plane reflection mirror 9. Between the light deflector 8 and the plane reflection mirror 9 is positioned an $f_\theta$ lens 10 for maintaining the beam diameter of the laser beam 3 uniform during the scanning of the laser beam 3 on the stimulable phosphor sheet 1. The laser beam source 2 is selected so that the laser beam 3 emitted thereby has a wavelength distribution which does not overlap that of the light emitted by the stimulable phosphor sheet 1 upon stimulation thereof. The stimulable phosphor sheet 1 is moved in the direction as indicated by the arrow 11 (i.e. the sub-scanning direction) by a sheet conveyance means 22 constituted by conveyor belts or the like and, thus, the whole surface of the stimulable phosphor sheet 1 is exposed to and scanned by the laser beam 3. When exposed to the laser beam 3 in this manner, the stimulable phosphor sheet 1 emits light in proportion to the radiation energy stored thereon, and the emitted light enters a light guide sheet 12.

The light guide sheet 12 is formed from a sheet of acrylic or other type transparent thermoplastic resin and has a linear light input face disposed opposite to the scanning line on the stimulable phosphor sheet 1 and an annular output face which is in close contact with the light receiving face of a light detector 13 such as a photomultiplier. The light emitted by the stimulable phosphor sheet 1 and entering the light input face of the light guide sheet 12 is guided through the interior of the light guide sheet 12 through total reflection to the light output face thereof and is thus detected by the light detector 13. Details regarding the preferred configuration, material etc. of the light guide sheet 12 are disclosed in, for example, Japanese Unexamined Patent Publication Nos. 55(1980)-87970 and 56(1981)-11397.

The light receiving face of the light detector 13 is closely contacted with a filter (not shown) for transmitting only light having the wavelength distribution of the light emitted by the stimulable phosphor sheet 1 and cutting off the light having the wavelength distribution of the stimulating rays, so that the light detector 13 can detect only the light emitted by the stimulable phosphor sheet 1 upon stimulation thereof.

The light detected by the light detector 13 is converted into an electrical signal which is forwarded through a switch 14 to a preliminary read-out amplifier 15. After being amplified by the amplifier 15, the signal is sent through an A/D converter 27 to a final read-out control circuit 16. On the basis of the image input information carried by the signal received from the light detector 13, the control circuit 16 calculates a read-out gain setting value (a), a scale factor setting value (b) and an electric image signal processing condition setting value (c).

The laser beam source 2, light deflector 8 and other elements for scanning the sheet 1 with stimulating rays, the light detector 13, switch 14 and other elements for detecting the light emitted by the sheet 1, and the sheet conveyance means 22 are all controlled by an operation control unit 24.

After the preliminary read-out is finished, the conveying direction of the sheet conveyance means 22 is reversed and the stimulable phosphor sheet 1 is returned to the read-out start position denoted by the numeral 17, whereafter final read-out is begun. In final read-out, although the laser source 2 again emits the laser beam 3, in this case the ND filter 5, the prism 6 and the concave lens 7 are moved out of the optical path of the laser beam 3 in the direction of the arrow 18 so that the stimulation energy of the laser beam 3 (the stimulating rays) reaching the stimulable phosphor sheet 1 is higher than that at the time of preliminary read-out.

The term "stimulation energy" as used in respect of this invention means the effective energy of the stimulating rays which the stimulable phosphor sheet receives per unit area. As the ratio of the stimulation energy of the stimulating rays in the preliminary read-out to the stimulation energy of the stimulating rays in the final read-out increases, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the read-out gain. However, in order to obtain a radiation image having an improved image quality, particularly a high diagnostic efficiency and accuracy, the aforesaid ratio should preferably be as small as possible. Thus, the aforesaid stimulation energy ratio should generally be 50% or less, preferably 10% or less, more preferably 3% or less. The lower limit of this ratio is determined according to the accuracy of the system for detecting the light emitted by the stimulable phosphor sheet in the preliminary read-out.

In the final read-out, the laser beam 3 emitted by the laser beam source 2 is first passed through the beam expander 4 to have its beam diameter strictly adjusted and is then one-dimensionally deflected by the light deflector 8 and directed onto the stimulable phosphor sheet 1 by the plane reflection mirror 9. The stimulable phosphor sheet 1 is moved at a constant speed in the direction as indicated by the arrow 11 (i.e. the sub-scanning direction) and its whole surface is thus exposed to and scanned by the laser beam 3. When exposed to the laser beam 3 in this manner, the stimulable phosphor sheet 3 emits light in proportion to the radiation energy stored thereon. The emitted light enters the light guide sheet 12 and is guided inside thereof to the light detector 13. The light detected by the light detector 13 is converted into an electric image signal which is forwarded through the switch 14 to a final read-out amplifier 19 the sensitivity of which has been adjusted by the read-out gain setting value (a). After being amplified to an appropriate level by the amplifier 19, the signal is sent to an A/D converter 20 which converts it into a digital signal by use of a scale factor (latitude) which has been set by the scale factor setting value (b) to suit the width of signal fluctuation. The digital signal thus obtained is sent to a signal processing circuit 21, in which it is processed (image-processed) on the basis of the electric image signal processing setting value (c) so as to obtain a radiation image suitable for viewing, particularly for diagnostic purposes. The electric image signal obtained by the signal processing is sent to a visible image reproducing apparatus 23 where it is reproduced as a visible image. For the signal processing it is possible to employ a frequency processing as disclosed in U.S. Pat. Nos. 4,346,295, 4,315,318 or 4,387,428, or a gradation processing as disclosed in U.S. Pat. Nos. 4,302,672, 4,276,473 or 4,310,886.

In the image reproducing apparatus 23, any of various methods can be used for reproducing a visible radiation image based on the electric image signal received from the signal processing circuit 21. For example, a laser beam modulated on the basis of the electric image signal can be made to scan a photoelectric material, the electric image signal can be electronically displayed on a display device such as a CRT, or a radiation image displayed on a CRT or the like can be recorded by use of a video printer or the like. Alternatively, the radiation image can be reproduced on a thermosensitive recording material by use of heat waves.

The apparatus according to the present invention is characterized in that it is provided with a preliminary read-out omission command circuit 25 for issuing a preliminary read-out omission signal S1 to the operation control unit 24 and with a fixed condition setting circuit 26 for issuing fixed condition signals a', b' and c' to the final read-out control circuit 16. The preliminary read-out omission command circuit 25 issues the preliminary read-out omission signal S1 when, for example, a switch thereof (not shown) located on console (not shown) of the radiation image read-out apparatus is depressed. Upon receiving the preliminary read-out prevention signal S1, the operation control unit 24 sets the operating condition of the read-out system to that for final read-out even before the stimulable phosphor sheet reaches the read-out start position 17. More specifically, it controls theread-out system so that the ND filter 5, the prism 6 and the concave lens 7 are moved out of the optical path of the laser beam 3 in the direction of the arrow 18, the beam diameter of the laser beam 3 is adjusted to that for final read-out by the beam expander 4, the switch 14 is set for sending the output from the light detector 13 to the final read-out amplifier 19, and the sheet conveyance means is set so as to discharge the sheet 1 from the read-out system after a single read-out of the radiation image information stored thereon, i.e. so as not to reverse the direction of conveyance following the read-out. The preliminary read-out omission command circuit 25 also sends the signal S1 to the fixed condition setting circuit 26. The fixed condition setting circuit 26 has a memory 26a in which one or more read-out gain setting values a', scale factor setting values b' and electric image signal processing setting values c' are stored in advance. Upon receiving the signal S1, the fixed condition setting circuit 26 reads a set of the values a', b' and c' from the memory 26a and sends it to the final read-out control circuit 16. As a result, the values a', b' and c' are input as predetermined fixed setting values to the final read-out amplifier 19, the A/D converter 20 and the signal processing circuit 21, respectively.

By fixing the read-out conditions (read-out gain and scale factor) and the electric image signal processing conditions independently of the image input information of the stimulable phosphor sheet in the aforesaid manner, it is possible to fulfill the need mentioned earlier for maintaining constant contrast among the radiation images reproduced from a plurality of stimulable phosphor sheets. Moreover, the radiation image read-out and processing speed is of course increased in proportion to the time saved by skipping the preliminary read-out.

If only one set of values a', b' and c' are stored in the memory 26a, this single set of values is automatically read and output by the fixed condition setting circuit 26 upon its receipt of the preliminary read-out prevention signal S1, whereas if a plurality of sets of these values are stored, the desired set is selected by means of a selector switch (not shown) at the time of operating the preliminary read-out omission switch.

For adjusting the stimulation energy of the laser beam 3 during preliminary read-out to a lower level than that during final read-out, instead of attenuating the laser beam 3 by use of the aforesaid ND filter 5 or by expanding the beam diameter thereof by the concave lens 7, it is possible to provide one laser source for final read-out and a separate laser source of lower power for preliminary read-out and to selectively switch between these two sources according to the kind of read-out being conducted. Alternatively, it is possible to shorten the oscillation period of the light deflector 8 so as to increase the main scanning speed of the laser 3 or to increase the sheet conveyance speed of the sheet conveyance means 22 so as to increase the sub-scanning speed.

There will now be described a second embodiment of the invention provided with separate final read-out and preliminary read-out systems.

FIG. 2 shows a radiation image read-out and reproducing system provided with a second embodiment of the image read-out apparatus in accordance with the present invention, while FIG. 3 shows an example of how a set of radiation images are recorded on a set of stimulable phosphor sheets which are to be subjected to radiation image read-out using the system shown in FIG. 2. As described for example in Japanese Unexamined Patent Publication No. 56(1981)-111399, the purpose of recording a set of radiation images as shown in FIG. 3 is to obtain an improved signal-to-noise ratio by superposition processing of the recorded image. More specifically, a stack of stimulable phosphor sheets, consisting in this example of five sheets 103A, 103B, 103C, 103D and 103E, are simultaneously exposed to X-rays 102 emitted by an X-ray source 100 and passing through an object 101. As a result, X-ray images of the same object 101 from the same direction are simultaneously recorded on the stimulable phosphor sheets 103A-103E. The X-ray images recorded on the sheets 103A-103E by this superposed sheet recording method are read-out using the system shown in FIG. 2. Detailed information regarding stimulable phosphors preferred for use in the stimulable phosphor sheets 103A-103E can be found in, for example, Japanese Unexamined Patent Publication Nos. 55(1980)-12142, 55(1980)-12144, 56(1981)-2385 and 56(1981)-2386.

Basically, the radiation image recording and reproducing system shown in FIG. 2 comprises a preliminary read-out section 30, a final read-out section 40 and an image reproducing section 50.

In the preliminary read-out section 30, a laser beam 202 emitted by a laser beam source 201 is first passed through a filter 203 for cutting off light having a wavelength within a range identical with the range of the wavelength of the light emitted by a stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution that does not overlap the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveyance means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out.

When exposed to the laser beam 202 as described above, the stimulable phosphor sheet 103 emits light in proportion to the X-ray energy stored thereon, and the emitted light enters a light guide sheet 207. The light is guided inside of the light guide sheet 207, emitted from a light output face of the light guide sheet 207 and received by a photomultiplier 208 acting as the light detection means. The light receiving face of the photomultiplier 208 is closely contacted with a filter for transmitting only light having the wavelength distribution of the light emitted by the stimulable phosphor sheet 103 and cutting off the light having the wavelength distribution of the stimulating rays, so that the photomultiplier 208 can detect only the light emitted by the stimulable phosphor sheet 103 upon stimulation thereof. The light detected by the light detector 208 is converted into an electrical image signal carrying the image input information and the electric image signal is forwarded to an amplifier 209. After being amplified by the amplifier 209, the signal is sent through an A/D converter 211 to a final read-out control circuit 314 of the final read-out section 40. On the basis of the image input information carried by the signal received from the light detector 208, the control circuit 314 calculates a read-out gain setting value (a), a scale factor setting value (b) and an electric image signal processing condition setting value (c).

After the preliminary read-out is finished, the stimulable phosphor sheet 103 is sent to the final read-out section 40. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. The beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an f$\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. the sub-scanning direction) by a sheet conveyance means 320 constituted by conveyor rollers or the like and, consequently the whole area of the stimulable phosphor sheet is exposed to and scanned by the laser beam 302. Upon exposure to the laser beam 302, the stimulable phosphor sheet 103 emits light in proportion to the X-ray energy stored thereon, and the light emitted enters a light guide sheet 309. The light emitted by the stimulable phosphor sheet 103 is guided inside of the light guide sheet 309 through total reflection, emitted from the light output face of the light guide sheet 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The light emitted by the stimulable phosphor sheet 103 and detected by the photodetector 310 in the final read-out is converted into an electric image signal which is amplified to an appropriate level by an amplifier 311 the sensitivity of which has been adjusted by the read-out gain setting value (a) and then sent to an A/D converter 312. In the A/D converter 312, the electric image signal is converted into a digital signal by use of a scale factor which has been set by the scale factor setting value (b) to suit the width of signal fluctuation. The digital signal thus obtained is sent to a superposition processing circuit 315 provided with a memory for temporarily storing the electric image signals for the five stimulable phosphor sheets 103A–103E. When read-out of all of the five stimulable phosphor sheets 103A–103E has been completed, the superposition processing circuit 315 then adds together the signals for the five sheets, whereby there can be obtained an electric image signal with a higher signal-to-noise ratio than any of the individual stimulable phosphor sheets 103A–103E. The digital signal obtained by the superposition processing is sent to a signal processing circuit 313, in which it is processed on the basis of the image processing condition value (c) so as to obtain a radiation image suitable for viewing, particularly for diagnostic purposes.

The electric image signal obtained by the signal processing circuit 313 is sent to a light modulator 401 at the image reproducing section 50. In the image reproducing section 50, a laser beam 403 emitted by a reproducing laser beam source 402 is modulated by the light modulator 401 on the basis of the electric image signal received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the scanning direction, i.e. in the direction as indicated by the arrow 406. Accordingly, the radiation image is recorded on the photosensitive material 405. For reproducing the radiation image, it is also possible to use any other appropriate method.

In addition to calculating the read-out gain setting factor (a), the scale factor setting value (b) and the electric image signal processing setting value (c) as described in the foregoing, the final read-out control circuit 314 also controls the operation of the elements of the final read-out section 40. In addition, there are provided a preliminary read-out control circuit 220 for controlling the elements of the preliminary read-out section 30 and an image reproduction control circuit 410 for controlling the elements of the image reproducing section 50. The control circuits 220, 314 and 410 are controlled by a main control unit 500 which receives operating signals from a console 501 and ID data relating to the object 101 (e.g. the name and complaint of the patient concerned) from ID terminals 502. Further, two special features of the radiation image read-out apparatus according to the present invention are that the console 501 is provided with a preliminary read-out omitting switch 503 and that the read-out gain setting value (a), the scale factor setting value (b) and the electric image signal processing condition setting value (c) can be stored in a memory 505 of a fixed condition setting circuit 504.

When the five stimulable phosphor sheets 103A–103E are subjected to read-out of the radiation images stored thereon, the preliminary read-out omission switch 503 is actuated for each of the sheets after the first, i.e. for the sheets 103B–103E, prior to the time that these sheets are subjected to read-out. Upon receiving a signal from the switch 503, the main control unit 500 sends a preliminary read-out omission signal S1 to each of the fixed condition setting circuit 504 and the preliminary read-out control circuit 220. Upon receiving the signal S1 the preliminary read-out omission circuit 220 sends a high-speed drive signal S2 to the sheet conveyance means 210. As a result, the sheet conveyance means 210 is driven at a high speed so that the sheets 103B–103E are sent to the final read-out section 40 at a speed substantially higher than that of the sub-scanning referred to earlier. At this time it makes no difference whether the laser source 201, the light deflector 204 and the photomultiplier 208 are kept in operation or stopped. If they are left operating, however, it is necessary for the preliminary read-out control circuit 220 to issue a command to the amplifier 209 preventing it from sending an output to the final read-out control unit 314.

When the stimulable phosphor sheets 103B–103E are subjected to final read-out in the final read-out section 40, the fixed condition setting circuit 504, which has already received the preliminary read-out omission signal S1, reads the scale factor setting value (b) and the electric image signal processing condition setting value (c) which were obtained for the first sheet 103A and stored in the memory 505 and sends these values as fixed conditions to the A/D converter 312 and the signal processing circuit 313. As a result, the scale factor (latitude) and the electric image processing conditions are fixed for all five of the stimulable phosphor sheets 103A–103E. Separately and for each of the stimulable phosphor sheets 103B–103E, a correction circuit 506 of the fixed condition setting circuit 504 corrects the read-out gain setting value (a) obtained for the first stimulable phosphor sheet 103A to a read-out gain setting value a′ and sends this corrected value a′ to the amplifier 311 as a fixed condition.

The electric image signals obtained for the five stimulable phosphor sheets 103A–103E are all subjected to A/D conversion using the same scale factor since it is preferable for them to have the same latitude when they are subjected to the superposition processing. On the other hand, since the recording of the radiation images on the stimulable phosphor sheets 103A–105E was conducted with the sheets stacked as shown in FIG. 3, the amount of X-ray energy stored by the respective sheets is lower in the direction from the first sheet 103A to the fifth sheet 103E. Therefore, in determining the read-out gain values for each of the sheets 103B–103E, the difference between the amount of x-ray energy stored by the first sheet 103A and each of the other sheets is calculated and the correction circuit 506 then corrects the read-out gain setting value (a) on the basis of the calculated difference and outputs the result of this correction as the corrected read-out gain setting value a′. At this time the read-out gain setting value (a) is also corrected to compensate for any differences in sensitivity among the sheets caused by differences in sheet thickness or the like. Where there are differences in sensitivity among the stimulable phosphor sheets, this can be indicated by marking them with a bar code or the like which can be detected by an appropriate detector in the radiation image read-out apparatus (not shown).

The difference in the amount of X-ray energy stored by the sheets 103A–103E can be calculated from the voltage of the X-ray source and the X-ray absorption characteristics of the respective sheets.

As only the first stimulable phosphor sheet 103A is subjected to preliminary read-out and the second to fifth sheets 103B–103E pass rapidly through the preliminary read-out section 30 without being read-out thereby, the speed at which the radiation images stored on the five sheets can be read-out and processed is considerably increased.

In conducting the aforesaid superposition processing, when the number of superposed sheets exposed at one time in the image recording step is small so that the difference in the amount of radiation energy stored by the respective sheets is slight, the read-out gain setting value (a) obtained for the first stimulable phosphor sheet need not be corrected but can be used as it is as the read-out gain setting value for the second and subsequent sheets.

While application of the present invention to the reading out of radiation images from sets of stimulable phosphor sheets recorded with radiation images to be subjected to superposition processing has been described by way of example, the invention can also be applied for reading out radiation images from stimulable phosphor sheets subjected to other types of superposition radiography such as contrasted blood vessel image radiography, simultaneous multilayer tomographic radiography, and high/low voltage radiography for energy subtraction processing.

Nor is the application of the apparatus according to the present invention limited to the reading out of radiation image sets. It can also be used for reading out various other types of radiation images which can be reproduced as visible radiation images with adequate diagnostic efficiency and accuracy for the purpose at hand even when preliminary read-out is omitted and the read-out conditions (read-out gain and scale factor) and the image processing conditions are fixed. Therefore, the higher read-out and image processing speed obtainable when the radiation image read-out apparatus according to this invention is operated without conducting preliminary read-out can also be enjoyed, for example, in reading out radiation images recorded for carrying out certain types of routine medical examinations such as when radiation images of the limbs of a number of objects are recorded using almost identical image recording conditions or when a phototimer is used to record radiation images of the chests of a number of objects employing fixed radiation image recording conditions, since in such cases it is ordinarily possible to obtain reproduced radiation images sufficient for the needs of the examination even when fixed read-out and image processing conditions are used.

If desired, the apparatus shown in FIG. 2 can of course be further provided with a fixed condition setting means which, like the fixed condition setting circuit 26 in the apparatus of FIG. 1, can in advance store one or more sets of prescribed fixed image read-out and processing conditions. In this case, if two or more sets of fixed conditions are stored, it is highly convenient from the practical point of view to provide a means for selecting the desired set of conditions not only on the console 501 but also in each of the X-ray rooms of the hospital or the like in which the apparatus is used. Also, where the apparatus of FIG. 2 is arranged to use the read-out gain setting value (a) obtained for the first stimulable phosphor sheet without correction as the read-out gain setting value for all of the sheets, it of course becomes unnecessary to provide the correction circuit 506. On the other hand, in a case where the apparatus is to be used in an application in which the scale factor setting value (b) and/or the electric image signal processing condition setting value (c) obtained for the first stimulable phosphor sheet 103A cannot be used as fixed conditions unless appropriately corrected, the apparatus can be further provided with circuits for correcting these values.

As explained in the foregoing, the present invention can be applied to either a radiation image readout apparatus provided with separate final and preliminary read-out systems or a radiation image read-out apparatus having only a single read-out system used for both final and preliminary read-out. From the point of increasing the speed of image read-out and processing, however, the present invention provides a particularly great effect when it is applied to an apparatus having separate read-out systems since in this case there is no need to carry out the complicated operation of once reversing the direction of travel of the stimulable phosphor sheet following preliminary read-out.

In the two embodiments of the invention described in the foregoing, both the final read-out conditions (the read-out gain and the scale factor) and the image processing conditions are determined on the basis of the preliminary read-out. The present invention can, however, also be applied to a radiation image read-out apparatus in which only the final read-out conditions are determined on the basis of the preliminary read-out or to one in which only the image processing conditions are determined on the basis of the preliminary read-out.

We claim:

1. A radiation image read-out apparatus comprising:
  (i) a final read-out system comprising a means for emitting stimulating rays to a stimulable phosphor sheet carrying a radiation image stored thereon, a means for moving said stimulable phosphor sheet, and a light detection means for photoelectrically detecting light carrying the radiation image and emitted by said stimulable phosphor sheet upon exposure to stimulating rays and converting it into an electric image signal for reproducing a visible image of the radiation image,
  (ii) a preliminary read-out system comprising a means for emitting stimulating rays, a means for moving said stimulable phosphor sheet, and a light detection means for photoelectrically detecting the light carrying the radiation image and emitted by said stimulable phosphor sheet upon exposure to stimulating rays and converting it into an electric signal representing the image input information of the stimulable phosphor sheet, the stimulation energy of the stimulating rays in the preliminary read-out being lower than that of the stimulating rays in the final read-out,
  (iii) signal processing means for processing the electric image signal from the final read-out system, and
  (iv) control means for setting final read-out conditions in said final read-out system and/or electric image signal processing conditions in said signal processing means on the basis of the image input information obtained by the preliminary read-out,
  wherein the improvement comprises the provision of a preliminary read-out omission command means for omitting the preliminary read-out and a fixed condition setting means for setting predetermined fixed final read-out conditions and/or electric image signal processing conditions when preliminary read-out is omitted.

2. An apparatus as defined in claim 1 wherein said final read-out system and said preliminary read-out system are separately provided.

3. An apparatus as defined in claim 1 wherein said final read-out system and said preliminary read-out system have the same means for emitting stimulating rays, means for moving said stimulable phosphor sheet and light detection means, and an adjusting means is provided for setting the stimulation energy of the stimulating rays in preliminary read-out lower than that in final read-out.

4. An apparatus as defined in any one of claims 1 to 3 wherein said fixed condition setting means sets fixed final read-out conditions and/or electric image processing conditions read from a memory in which such conditions are stored in advance.

5. An apparatus as defined in any one of claims 1 to 3 wherein said fixed condition setting means sets fixed final read-out conditions and/or electric image processing conditions which are the same as the final read-out conditions and/or electric image processing conditions which were set by said control means in respect of a stimulable phosphor sheet previously subjected to final read-out.

6. An apparatus as defined in any one of claims 1 to 3 wherein said fixed condition setting means corrects at least one of the final read-out conditions and the electric image processing conditions which were set by said control means in respect of a stimulable phosphor sheet previously subjected to final read-out and sets the corrected conditions as at least one of the fixed final read-out conditions and the electric image processing conditions.

* * * * *